(12) United States Patent
Jaladanki et al.

(10) Patent No.: US 8,521,866 B2
(45) Date of Patent: Aug. 27, 2013

(54) REPORTING MULTIPLE EVENTS IN A TRAP MESSAGE

(75) Inventors: Malyadri Jaladanki, San Jose, CA (US); Annie Dang, Danville, CA (US); Yung-Ching Tseng, Sunnyvale, CA (US); Albert Fong, San Francisco, CA (US); Lisa H. Nguyen, San Jose, CA (US)

(73) Assignee: Tellabs San Jose, Inc., Naperville, IL (US)

( * ) Notice: Subject to any disclaimer, the term of this patent is extended or adjusted under 35 U.S.C. 154(b) by 638 days.

(21) Appl. No.: 11/863,214

(22) Filed: Sep. 27, 2007

(65) Prior Publication Data
US 2009/0089414 A1 Apr. 2, 2009

(51) Int. Cl.
*G06F 15/173* (2006.01)

(52) U.S. Cl.
USPC .......................................................... 709/224

(58) Field of Classification Search
USPC .......................................................... 709/224
See application file for complete search history.

(56) References Cited

U.S. PATENT DOCUMENTS

| | | | | |
|---|---|---|---|---|
| 5,751,914 A * | 5/1998 | Coley et al. | ..................... | 706/47 |
| 5,903,898 A * | 5/1999 | Cohen et al. | ................... | 707/648 |
| 6,292,472 B1 * | 9/2001 | Rariden et al. | ................ | 370/254 |
| 6,487,168 B1 * | 11/2002 | Hamami | ...................... | 370/216 |
| 6,714,978 B1 * | 3/2004 | Porter | ........................... | 709/224 |
| 6,775,707 B1 * | 8/2004 | Bennett et al. | ................ | 709/233 |
| 6,782,388 B2 * | 8/2004 | Majewski et al. | ............... | 707/10 |
| 7,197,558 B1 * | 3/2007 | Harper et al. | ................. | 709/224 |
| 7,308,700 B1 * | 12/2007 | Fung et al. | .................... | 725/111 |
| 7,366,775 B2 * | 4/2008 | Taylor | ........................... | 709/224 |
| 7,434,109 B1 * | 10/2008 | Stabile et al. | ................ | 714/47.2 |
| 2001/0052010 A1 * | 12/2001 | Kim | ................................ | 709/224 |
| 2003/0126585 A1 * | 7/2003 | Parry | ........................... | 717/124 |
| 2003/0131284 A1 * | 7/2003 | Flanagan et al. | ................ | 714/38 |
| 2003/0163275 A1 * | 8/2003 | Farrell et al. | .................. | 702/127 |
| 2004/0122972 A1 * | 6/2004 | Gibson et al. | ................ | 709/236 |
| 2006/0053220 A1 * | 3/2006 | Konishi et al. | ............... | 709/224 |
| 2007/0198281 A1 * | 8/2007 | Abernethy et al. | ............... | 705/1 |
| 2007/0271377 A1 * | 11/2007 | Yamamoto et al. | ........... | 709/224 |
| 2007/0288789 A1 * | 12/2007 | Harper et al. | ..................... | 714/1 |
| 2008/0098103 A1 * | 4/2008 | Packiam | ....................... | 709/223 |
| 2008/0316931 A1 * | 12/2008 | Qiu et al. | ...................... | 370/245 |

* cited by examiner

*Primary Examiner* — Christopher Biagini
(74) *Attorney, Agent, or Firm* — Fitzpatrick, Cella, Harper & Scinto

(57) ABSTRACT

A method for reporting events relating to objects of a network element manageable by a network management device, using a network management protocol, and devices, a network, and computer-readable storage medium storing control logic, that operate in accordance with the method. Events for each object are detected, event information is generated for detected events, generated event information for multiple events is packaged into a trap message for each object type, the trap message is communicated from the network element to the network management device, and the event information from the communicated trap message is unpacked at the network management device. In this manner, network congestion and processor overload at the network management device can be reduced.

34 Claims, 15 Drawing Sheets

```
V1: 2007-07-05 16:07:27
    Enterprise Mib Oid = trapV1Notifications
    sysUpTime.0 = Timeticks: (18953329) 2 days, 4:38:53
    Enterprise Specific Trap (cktBndlAddMbrV1Trap)
    eventHistorySeqNum.28445 = 28445
    eventHistoryEventId.28445 = 1252
    eventHistorySetTime.28445 = Gauge: 1183650505
    eventHistorySeverity.28445 = informational(4)
    eventHistoryInstanceType.28445 = circuit(6)
    eventHistoryInstanceId.28445 = 33554433
    eventHistoryInstanceName.28445 = 1
    eventHistoryDescription.28445 = CKTB bun1          Cktb member <a1> added
    eventHistoryState.28445 = clear(3)
    eventHistoryLastTime.28445 = Gauge: 1183650505
    eventHistoryRefSeqNum.28445 = 0
    trapSwitchOverCounter.0 = 0
    circuitId.33554433 = Gauge: 4259
    circuitBundleOptionPriority.33554433 = 0
    circuitBundleMemberCount.33554433 = 2 seconds
    circuitBundleFailureReason.0 = none(1)
```

FIG. 5

```
V1: 2007-07-05 15:48:42
    Enterprise Mib Oid = trapV1Notifications
    sysUpTime.0 = Timeticks: (18840778) 2 days, 4:20:07
    Enterprise Specific Trap (cktBndlDelMbrV1Trap)
    eventHistorySeqNum.28430 = 28430
    eventHistoryEventId.28430 = 1253
    eventHistorySetTime.28430 = Gauge: 1183649379
    eventHistorySeverity.28430 = informational(4)
    eventHistoryInstanceType.28430 = circuit(6)
    eventHistoryInstanceId.28430 = 33555134
    eventHistoryInstanceName.28430 = 2
    eventHistoryDescription.28430 = CKTB bun2           Cktb member <a2> deleted
    eventHistoryState.28430 = clear(3)
    eventHistoryLastTime.28430 = Gauge: 1183649379
    eventHistoryRefSeqNum.28430 = 0
    trapSwitchOverCounter.0 = 0
    circuitId.33555134 = Gauge: 4258
    circuitBundleMemberCount.33555134 = 1 seconds
    circuitBundleFailureReason.0 = none(1)
```

FIG. 6

```
V1: 2007-07-05 15:46:14
    Enterprise Mib Oid = trapV1Notifications
    sysUpTime.0 = Timeticks: (18825743) 2 days, 4:17:37
    Enterprise Specific Trap (cktBndlOffLineV1Trap)
    eventHistorySeqNum.28413 = 28413
    eventHistoryEventId.28413 = 1251
    eventHistorySetTime.28413 = Gauge: 1183649229
    eventHistorySeverity.28413 = informational(4)
    eventHistoryInstanceType.28413 = circuit(6)
    eventHistoryInstanceId.28413 = 33555135
    eventHistoryInstanceName.28413 = 3
    eventHistoryDescription.28413 = CKTB bun3        Cktb oper down - admin disabled
    eventHistoryState.28413 = clear (3)
    eventHistoryLastTime.28413 = Gauge: 1183649229
    eventHistoryRefSeqNum.28413 = 0
    trapSwitchOverCounter.0 = 0
    circuitBundleFailureReason.0 = none (1)
```

FIG. 7

V1: 2007-07-05 15:47:40
    Enterprise Mib Oid = trapV1Notifications
    sysUpTime.0 = Timeticks: (18834667) 2 days, 4:19:06
    Enterprise Specific Trap (cktBndlOnLineV1Trap)
    eventHistorySeqNum.28419 = 28419
    eventHistoryEventId.28419 = 1250
    eventHistorySetTime.28419 = Gauge: 1183649318
    eventHistorySeverity.28419 = informational(4)
    eventHistoryInstanceType.28419 = circuit(6)
    eventHistoryInstanceId.28419 = 33555136
    eventHistoryInstanceName.28419 = 4
    eventHistoryDescription.28419 = CKTB bun4         Cktb oper up, actv mbr <a4>
    eventHistoryState.28419 = clear(3)
    eventHistoryLastTime.28419 = Gauge: 1183649318
    eventHistoryRefSeqNum.28419 = 0
    trapSwitchOverCounter.0 = 0
    circuitId.33555136 = Gauge: 4256
    circuitBundleMemberCount.33555136 = 2 seconds

FIG. 8

```
V1: 2007-07-05 16:13:06
    Enterprise Mib Oid = trapV1Notifications
    sysUpTime.0 = Timeticks: (18987192) 2 days, 4:44:31
    Enterprise Specific Trap (cktBndlBulkChangeV1Trap)
    eventHistorySeqNum.28467 = 28467
    eventHistoryEventId.28467 = 1254
    eventHistorySetTime.28467 = Gauge: 1183650843
    eventHistorySeverity.28467 = informational(4)
    eventHistoryInstanceType.28467 = node(2)
    eventHistoryInstanceId.28467 = 1
    eventHistoryInstanceName.28467 =
    eventHistoryDescription.28467 = CKTB 1 Up:1 dn:0 add:0 del:0 en:1 dis:1 mod:0 mAdd: 1 mDel: 1
    eventHistoryState.28467 = clear(3)
    eventHistoryLastTime.28467 = Gauge: 1183650843
    eventHistoryRefSeqNum.28467 = 0
    trapSwitchOverCounter.0 = 0
    circuitBundleBulkTrapEventBitMaskList.0 =  Hex: 01 04 02 00 00 01 00 80 01 00 00 10 A3
02 02 00 02 BE 01 00 01 00 00 10 A2 01 02 00 02 BF 00 02 01 00 00 08 D2 02 02 00 02 C0 00 05 01
00 00 10 A0 02
```

FIG. 9

| 1110 | 1120 |
|---|---|
| Version of the format (1 Octet) | The number of Circuit Bundle Event BitMasks (1 Octet) |
| *(Byte 1)* | *(Byte 2)* |
| 01 | 04 |

| Bundle No# | Bundle Id (4 Octets) 1130 | Event Mask (2 Octets) 1140 | Failure Reason (1 Octet) 1150 | Member Circuit Id (4 Octets) 1160 | Member Priority & Total member count (1 Octet) [4 bits: Priority] [4 bits: count] 1170 |
|---|---|---|---|---|---|
| *n* | *Bytes (n\*12)+3, (n\*12)+4, (n\*12)+5, (n\*12)+6* | *Bytes (n\*12)+7, (n\*12)+8* | *Bytes (n\*12)+9* | *Bytes (n\*12)+10, (n\*12)+11, (n\*12)+12, (n\*12)+13* | *Bytes (n\*12)+14* |
| 0 | 02 00 00 01 Instance: 33554433 | 00 80 7th Bit Set – Member Add | 01 Value N/A in this case | 00 00 10 A3 Added Ckt Id : 4259 | 02 Priority: 0 Total Member Count : 2 |
| 1 | 02 00 02 BE Instance: 33555134 | 01 00 8th Bit Set – Member detached | 01 Value N/A in this case | 00 00 10 A2 Deleted Ckt Id : 4258 | 01 Priority: N/A Total Member Count : 1 |
| 2 | 02 00 02 BF Instance: 33555135 | 00 02 1st Bit Set – Admin Disabled | 01 Value N/A in this case | 00 00 08 D2 Value N/A in this case | 02 Priority: N/A Total Member Count : 2 |
| 3 | 02 00 02 C0 Instance: 33555136 | 00 05 0th bit Set – Admin Enabled 2nd Bit Set – Bundle Online | 01 Value N/A in this case | 00 00 10 A0 Active Ckt Id : 4256 | 02 Priority: N/A Total Member Count : 2 |

FIG. 10

| Bits | Definition |
|---|---|
| 0,1 | Admin State Change, 2 bits that means:<br>00: no Admin Change Event occurred<br>01: Admin Change occurred; AdminState is Enabled<br>10: Admin Change occurred; AdminState is Disabled<br>11: for future expansion |
| 2 | Circuit Bundle Online/Up occurred, 1 bit that means:<br>0: no Circuit Bundle Online/Up Event occurred<br>1: Circuit Bundle Online/Up occurred |
| 3 | Circuit Bundle Offline/Down occurred, 1 bit that means:<br>0: no Circuit Bundle Offline/Down Event occurred<br>1: Circuit Bundle Offline/Down occurred |
| 4 | Circuit Bundle Delete occurred, 1 bit that means:<br>0: no Circuit Bundle Delete Event occurred<br>1: Circuit Bundle Delete occurred |
| 5 | Circuit Bundle Add occurred, 1 bit that means:<br>0: no Circuit Bundle Add Event occurred<br>1: Circuit Bundle Add occurred |
| 6 | Attribute Changed occurred, 1 bit that means:<br>0: no attribute Change Event occurred<br>1: Attribute Change occurred |
| 7 | Member Attachment occurred, 1 bit that means:<br>0: no Member Attachment Event occurred<br>1: Member Attachment occurred |
| 8 | Member Detachment occurred, 1 bit that means:<br>0: no Member Detachment Event occurred<br>1: Member Detachment occurred |

FIG. 11

REPORTING MULTIPLE EVENTS IN A TRAP MESSAGE

BACKGROUND

1. Field

Example aspects of the present invention generally relate to managing network devices, and, more particularly, to using a network management protocol to report events relating to objects of a network device manageable by a network management device.

2. Related Art

A network element (NE) is a telecommunications device that is interconnected with other network elements to form a network. Typical network elements include routers, switches, hubs, network edge equipment, and premises equipment. Each network element may include multiple objects, such as, for example, circuits, virtual circuits, interfaces, and Multiprotocol Label Switching (MPLS) Label Switched Paths (LSPs), that may be monitored by a network management system (NMS), which is a hardware device running software used to monitor and administer the network. Using a network management protocol, such as, for example, Simple Network Management Protocol (SNMP), a network element reports events relating to these manageable objects to the network management system. Events may include alarms, status changes, and configuration changes, or the like. Typically, each event is reported by sending a trap message (e.g., an SNMP trap message) to the network management system when the event occurs.

BRIEF DESCRIPTION

The inventors have recognized that when catastrophic failures or significant configuration changes occur at a network element (NE), the network may become congested, and the processor(s) of the network management system (NMS) may become exhausted or overloaded. For example, if all virtual circuits of a network element fail, the network element may send a trap message to the network management system for each failure. In network elements having thousands of virtual circuits, the large number of trap messages sent may congest the network and overload the network management system.

Similarly, if thousands of virtual circuits are created on a network element, thousands of trap messages reporting the creation of each virtual circuit may be sent to the network management system, which may congest the network and overload the network management system. FIG. 1 illustrates two network elements 121 and 122 sending individual trap messages for each event to a network management system 160.

The example embodiments described herein overcome the above-identified limitations by providing a method for reporting events relating to objects of a network element manageable by a network management device, using a network management protocol, and devices, a network, and computer-readable storage medium storing control logic, that operate in accordance with the method.

According to an example aspect of the invention, events for each object are detected, event information is generated for detected events, generated event information for each object type is packaged into a trap message, the trap message is communicated from a network element to a network management device, and the event information from the communicated trap message is unpacked at the network management device.

By virtue of packaging event information for multiple events into a trap message, fewer trap messages may be sent by a network element relative to pre-existing cases. In this manner, network congestion and processor overload at the network management system can be reduced.

The event information for an object can be stored, or sent to the network management device in an individual trap message, based on a configuration property for the object. If a region of a memory contains information for a predetermined number of events, the event information can be packaged in a trap message, and the trap message can be sent to the network management device.

Generated event information for a same object type can be stored in a same region in a memory, and the stored event information for each object type can be periodically packaged into a trap message at predetermined time periods.

The trap message can include SNMP trap messages, the event information can be packaged as an SNMP variable binding in the SNMP trap message, and the network management device can include a network management system (NMS) that processes SNMP trap messages. The event information can be packaged by encoding the event information as a numerical value, and the event information can be unpacked by decoding the numerical value.

The network element can include at least one of, e.g., a router, switch, hub, network edge equipment, and premises equipment, or the like. Manageable object types can include at least one of, e.g., circuits, circuit bundles, virtual circuits, interfaces, and Multiprotocol Label Switching (MPLS) Label Switched Paths (LSPs), or the like. Events can include at least one of, e.g., enabling an object, disabling an object, adding an object, deleting an object, changing attributes of an object, adding members to a group object, removing members from a group object, an object failure, an object recovery, and a change in operational status, or the like.

Further features and advantages, as well as the structure and operation, of various example embodiments of the present invention are described in detail below with reference to the accompanying drawings.

BRIEF DESCRIPTION OF THE DRAWINGS

The features and advantages of the example embodiments of the invention presented herein will become more apparent from the detailed description set forth below when taken in conjunction with the drawings in which like reference numbers indicate identical or functionally similar elements:

FIGS. 5 to 8 depict examples of individual trap messages.

FIG. 9 illustrates a bulk trap message, in accordance with an example embodiment of the present invention.

FIG. 10 illustrates a decoded bulk trap message, in accordance with an example embodiment of the present invention.

FIG. 11 illustrates a format of a bitmask used to decode a bulk trap message, in accordance with an example embodiment of the present invention.

Identically labeled elements appearing in different ones of the figures refer to the same elements but may not be referenced in the description for all figures.

DETAILED DESCRIPTION

Figure 1:
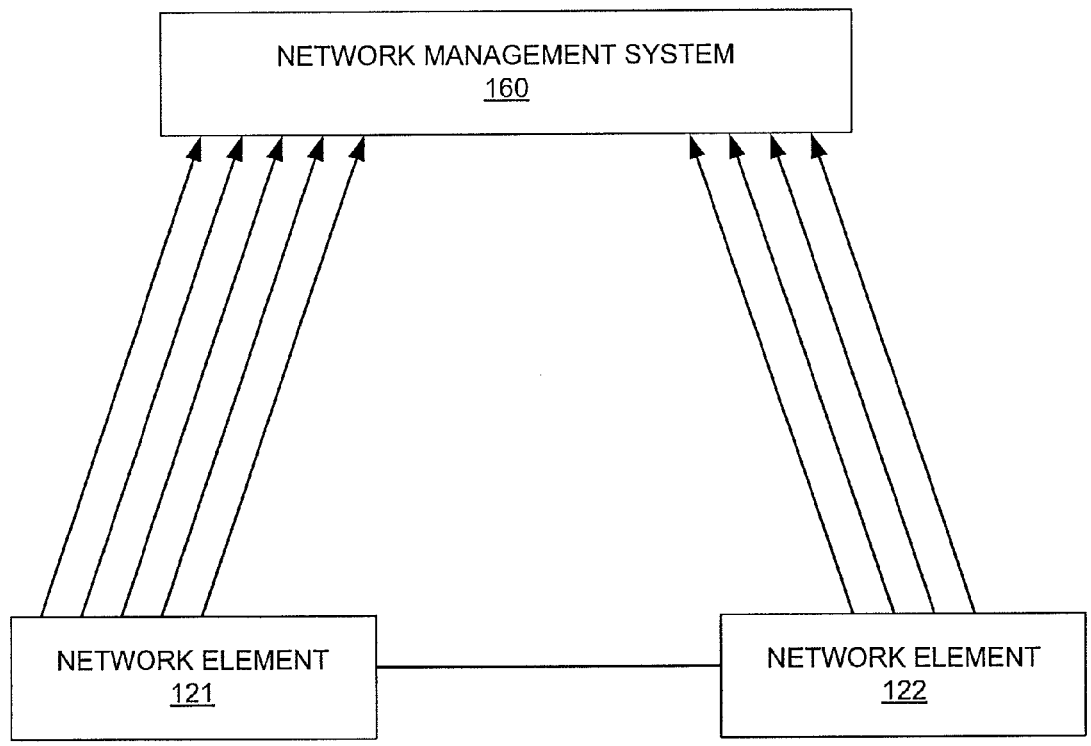
FIG. 1 is a diagram representing the sending of individual trap messages for events.
Figure 2:
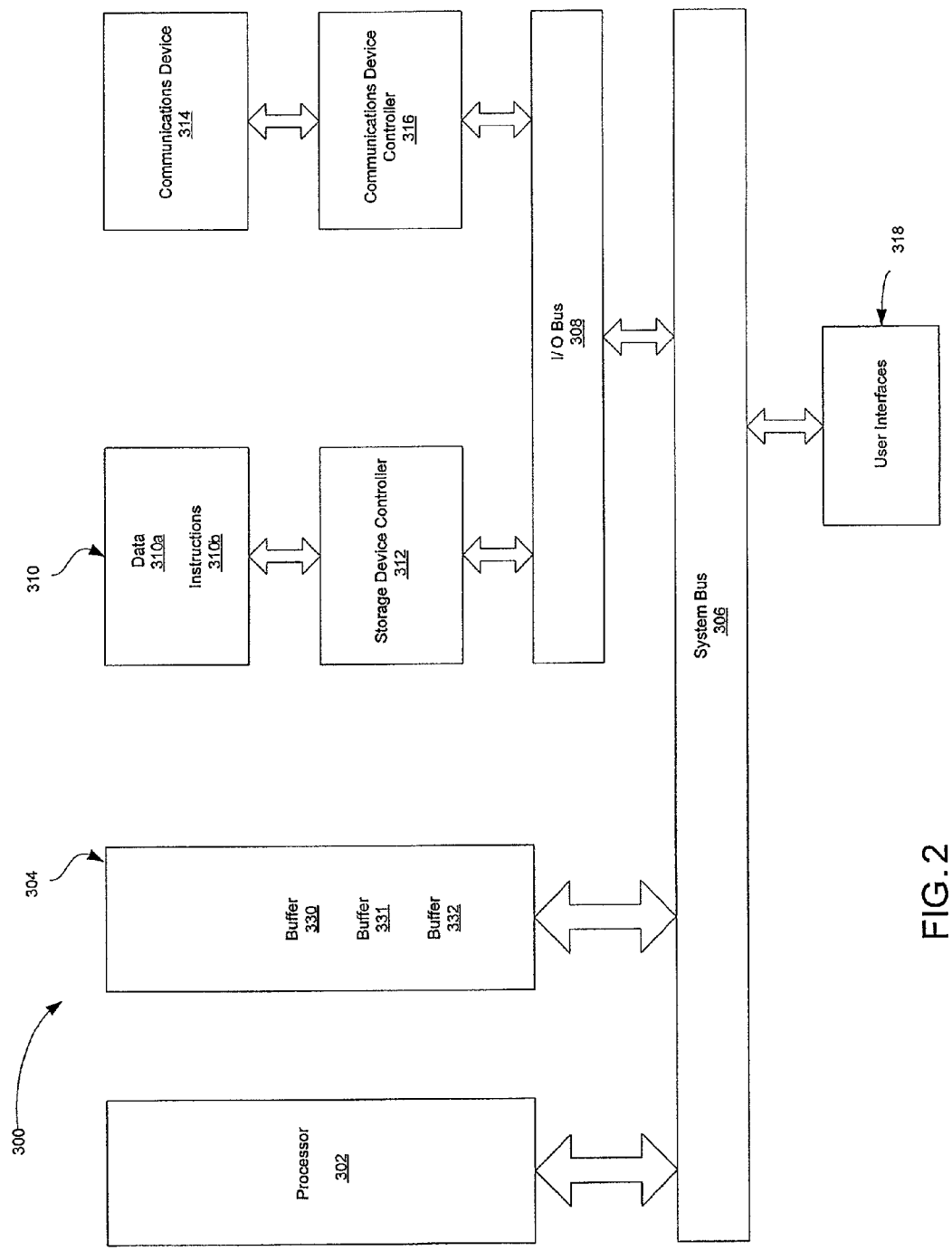
FIG. 2 is an architecture diagram of a data processing system in accordance with an example embodiment of the invention.

FIG. 2 is an architecture diagram of an example data processing system or device 300, which, according to an example embodiment, can form individual ones of network elements (e.g., 811, 812, and 821 to 824 of FIGS. 3 and 421 and 422 of FIG. 4), network management systems (e.g., 860 of FIGS. 3 and 460 of FIG. 4), and/or any other type of a network device supporting a network management protocol (e.g., SNMP). Data processing system 300 includes a processor 302 coupled to a memory 304 via system bus 306. Buffers 330 to 331 are regions in memory 304 that store temporary data. Processor 302 is also coupled to external Input/Output (I/O) devices (not shown) via the system bus 306 and an I/O bus 308, and to at least one input/output user interface 318. Processor 302 may be further coupled to a communications device 314 via a communications device controller 316 coupled to the I/O bus 308. Processor 302 uses the communications device 314 to communicate with a network, such as, for example, a network as shown in any of FIGS. 3 and 4. A storage device 310 having a computer-readable medium is coupled to the processor 302 via a storage device controller 312 and the I/O bus 308 and the system bus 306. The storage device 310 is used by the processor 302 and controller 312 to store and read/write data 310a, and to store program instructions 310b used to implement the procedures described below in connection with FIGS. 12 and/or 13. Regions in storage device 310 can be used as buffers to store temporary data, in addition to, or in place of buffers 330 to 331 in memory 304. The storage device 310 also stores various routines and operating programs (e.g., Microsoft Windows, UNIX/LINUX, or OS/2) that are used by the processor 302 for controlling the overall operation of the system 300. At least one of the programs (e.g., Microsoft Winsock) stored in storage device 310 can adhere to TCP/IP protocols (i.e., includes a TCP/IP stack), for implementing a known method for connecting to the Internet or another network. According to an example aspect of the invention, in the case of at least the network elements (e.g., 811, 812, and 821 to 824) and network management system (e.g., 860), at least one of the programs stored in storage device 310 adheres to the SNMP protocol (i.e., includes a SNMP stack), for implementing known methods for sending and receiving trap messages, as well as other SNMP messages.

In operation, processor 302 loads the program instructions 310b from the storage device 310 into the memory 304. Processor 302 then executes the loaded program instructions 310b to perform any of the example methods described below, for operating the system 300 (which forms individual ones of the components, such as, network elements 811, 812, and 821 to 824, and network management system 860 of FIG. 3).

Data 310a stores configuration properties which are specified by configuration instructions received via communications device 314 and/or user interface 318. Another network device, such as, for example, a network management system in communications device 314, can use a network management protocol, such as Simple Network Management Protocol (SNMP), or any other suitable type of communication protocol, to send configuration instructions to device 300. User interface 318 can receive communication instructions from a user and present configuration information to a user. User interface 318 includes at least one of a command line interface and a graphical user interface.

According to an example aspect of the invention, in the case of at least the network elements (e.g., 811, 812, and 821 to 824), data 310a includes configuration properties for objects of the network element manageable by a network management device. Objects can include, e.g., virtual circuits, circuit bundles, Multiprotocol Label Switching (MPLS) Label Switched Paths (LSPs), and interfaces, or the like. Configuration properties included in data 310a include at least one configuration property for each object that specifies whether information for events (e.g., alarms, status changes, configuration changes, or the like), relating to an object, should be stored in a buffer, or sent to a network management device in an individual trap message.

Figure 3:
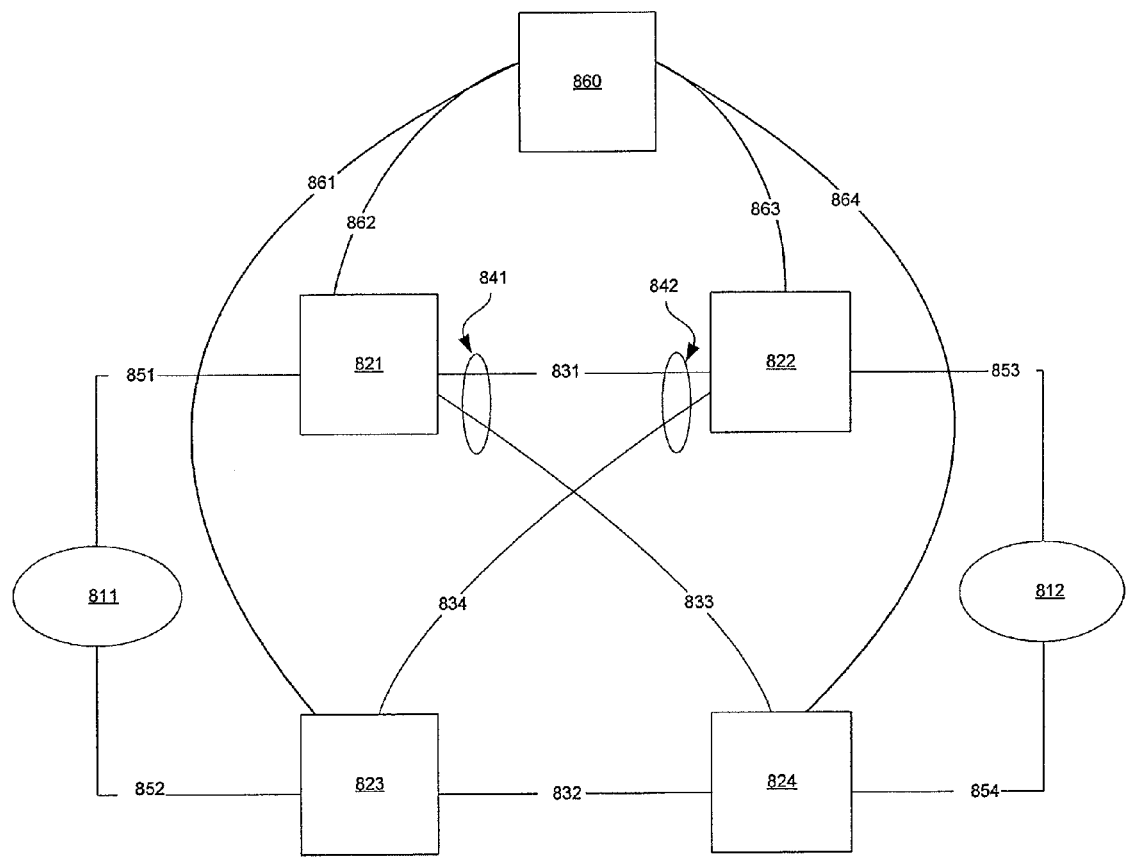
FIG. 3 is a network diagram showing interconnected network elements, in communication with a network management system, in accordance with an example embodiment of the present invention.

Instructions 310b stored on storage device 310 enable the system 300 to (i) detect events for each object of system 300 manageable by a network management device, (ii) generate event information for detected events, (iii) determine whether to store event information for an object, based on at least one configuration property for the object included in 310a, (iv) send the event information to the network management device in an individual trap message, if it is determined to not store the event information, (v) store the generated event information for the same object type (e.g., virtual circuit, circuit bundle, MPLS LSP, and interface) in the same buffer, if it is determined to store the event information, (vi) periodically package the stored event information for each object type into a trap message at predetermined time periods, and (vii) send the trap message to a network management device (e.g., 860 of FIG. 3).

In the case of at least the network management system (e.g., 860), the storage device 310 also stores instructions 310b which enable the system 300 to (i) receive a trap message including packaged information for events occurring at a network element, and (ii) unpack the event information from the received trap message.

FIG. 3 is a network diagram showing interconnected network elements, configured for providing a point-to-point application in accordance with an example embodiment of the present invention, but in other embodiments, the network elements can be configured for providing a point-to-multipoint application, a multipoint-to-multipoint application, or any other suitable application. Virtual circuits 831, 832, 833, and 834 represent logical paths through a service provider's network through which provider edge devices exchange information. Virtual circuits can emulate, for example, layer-2 links, such as, Asynchronous Transfer Mode (ATM) and Frame Relay links, although the circuits are not limited to those types of links only.

Virtual circuits 831, 832, 833, and 834 are, for example, all operationally up point-to-point virtual circuits of the same type, such as Ethernet, Interworking Function (IWF), Virtual Local Area Network (VLAN), VLAN (Q-in-Q), ATM, or Frame Relay circuits, or any other suitable types of point-to-point virtual circuits. Virtual circuit 831 connects provider edge devices 821 and 822, virtual circuit 832 connects provider edge devices 823 and 824, virtual circuit 833 connects provider edge devices 821 and 824, and virtual circuit 834 connects provider edge devices 822 and 823.

Circuit bundles 841 and 842 are logical groupings of virtual circuits. A circuit bundle (e.g., 841 and 842) provides the ability to group virtual circuits of the same type for resiliency/ protection. There is an active bundle member that is selected based on user configured priority for carrying circuit traffic. When the active bundle member fails for some reason, alternative bundle members (i.e., virtual circuits) are selected to carry the circuit traffic, again based on user-configured priority. Bundle members can have different destinations.

Virtual circuits 831 and 833 form circuit bundle 841 on provider edge device 821, with virtual circuit 831 being an active bundle member and virtual circuit 833 being an inactive bundle member. Virtual circuits 831 and 834 form circuit bundle 842 on provider edge device 822, with virtual circuit 831 being an active bundle member and virtual circuit 834 being an inactive bundle member.

Links 851 through 854 connect customer edge devices to provider edge devices. Links 851 through 854 can be formed by one or more network cables, wireless interfaces, intermediary devices, and/or any other suitable types of linking devices. Link 851 connects customer edge device 811 and provider edge device 821, link 852 connects customer edge device 811 and provider edge device 823, link 853 connects customer edge device 812 and provider edge device 822, and link 854 connects customer edge device 812 and provider edge device 824.

Customer edge devices 811 and 812, provider edge devices 821 through 824, and network management system (NMS) 860 are data processing systems like data processing system 300 of FIG. 2, according to an example embodiment of the invention.

Customer edge devices 811 and 812 provide entry points into at least one core network. Customer edge devices 811 and 812 each include, for example, one or more of a router, switch, routing switch, integrated access device, Internet Protocol telephone, Ethernet unit, video device, computer terminal, digital subscriber line connection, cable modem, wireless access, as well as any other network component(s). Customer edge device 811 is configured to send and receive packets via links 851 and 852. Customer edge device 812 is configured to send and receive packets via links 853 and 854.

Provider edge devices 821 through 824 provide entry points into a service provider's network, and each include one or more of a router, switch, routing switch, and/or any other network components. Provider edge device 821 is configured to forward packets received via link 851 through circuit bundle 841, and to forward packets received via circuit bundle 841 through link 851. Provider edge device 822 is configured to forward packets received via link 853 through circuit bundle 842, and to forward packets received via circuit bundle 842 through link 853. Provider edge device 823 is configured to forward packets received via link 852 through virtual circuits 832 and 834, and to forward packets received via virtual circuits 832 and 834 through link 852. Provider edge device 824 is configured to forward packets received via link 854 through virtual circuits 832 and 833, and to forward packets received via virtual circuits 832 and 833 through link 854.

Provider edge devices 821 through 824 communicate with network management system (NMS) 860 via links 861 to 864, respectively, using a network management protocol, such as, for example, Simple Network Management Protocol (SNMP), or any other suitable network management protocol. Links 861 through 864 can be formed by one or more network cables, wireless interfaces, intermediary devices, and/or any other suitable types of linking devices.

Provider edge device 821 is configured to store event information for virtual circuits 831 and 833 after the information is generated, instead of sending the event information to network management device 860 in individual trap messages. This stored event information is sent to network management device 860 in a single trap message at a predetermined time, according to one example embodiment of the invention. Similarly, provider edge device 822 is configured to store event information for virtual circuits 831 and 834 after the information is generated, instead of sending the event information to network management device 860 in individual trap messages.

In operation, a packet is sent by customer edge device 811 via either link 851 or 852. Customer edge device 811 uses a link protection mechanism/algorithm, such as, for example, the Spanning Tree Protocol (STP), or any other suitable type of link protection mechanism/algorithm, to determine whether to send the packet via link 851 or 852.

A packet sent by customer edge device 811 via link 851 arrives at provider edge device 821. After receiving the packet, provider edge device 821 forwards the packet through the active bundle member of circuit bundle 841, which is virtual circuit 831, and the packet arrives at provider edge device 822. Since virtual circuit 831 is the active bundle member of circuit bundle 842 on provider edge device 822, provider edge device 822 receives the packet and forwards it to customer edge device 812 via link 853.

A packet sent by customer edge device 811 via link 852 arrives at provider edge device 823. After receiving the packet, provider edge device 823 forwards the packet through virtual circuits 832 and 834, and the packet arrives at provider edge devices 824 and 822, respectively. Provider edge device 824 forwards the packet to customer edge device 812 via link 854. Since virtual circuit 834 is an inactive bundle member of circuit bundle 842 on provider edge device 822, provider edge device 822 drops the packet.

If provider edge devices 821 and 822 detect that virtual circuit 831 fails, provider edge device 821 activates virtual circuit 833 in circuit bundle 841, and provider edge device 822 activates virtual circuit 834 in circuit bundle 842.

When provider edge device 821 detects that virtual circuit 831 fails, provider edge device 821 generates event information including details of the failure, and stores this generated event information in its virtual circuit buffer. The virtual circuit buffer is a region of memory 304 (e.g., 330 to 331) and/or storage device 310 used to store information for events relating to virtual circuits. When virtual circuit 833 is activated by provider edge device 821, provider edge device 821 generates event information indicating that virtual circuit 833 has been activated, and stores this generated event information in its virtual circuit buffer.

After a predetermined time period, provider edge device 821 packages the event information stored in its virtual circuit buffer into a trap message, and sends the trap message to network management system 860 through link 862. If information for a predetermined number of events is stored in its virtual circuit buffer, provider edge device 821 generates and sends the trap message to network management system 860 before the predetermined time period.

The predetermined time and predetermined number of events can be specified by hardcoded values in instructions 310*b*, or specified by configurable values stored as data 310*a*. These values can be determined based on, e.g., predetermined system design and operating criteria.

Similarly, provider edge device 822 generates event information when it detects that virtual circuit 831 fails and when it activates virtual circuit 834, stores information for these events in its virtual circuit buffer, and generates and sends the trap message to network management system 860 through link 863, in a similar manner as described for provider edge device 821.

In the present example embodiment, the trap messages are SNMP trap messages, the event information is packaged as an SNMP variable binding in the SNMP trap message, and network management system 860 has an SNMP protocol stack for processing SNMP trap messages. In other embodiments, trap messages of other network management protocols may be used. The event information is packaged by encoding the event information as a numerical value. When the network management system 860 receives a trap message, it unpacks the event information by decoding the numerical value, as described below for FIGS. 10 and 11.

In this manner, a single bulk trap message can report information for multiple events, and the number of individual trap messages sent can be reduced relative to conventional trap message systems.

Figure 4:
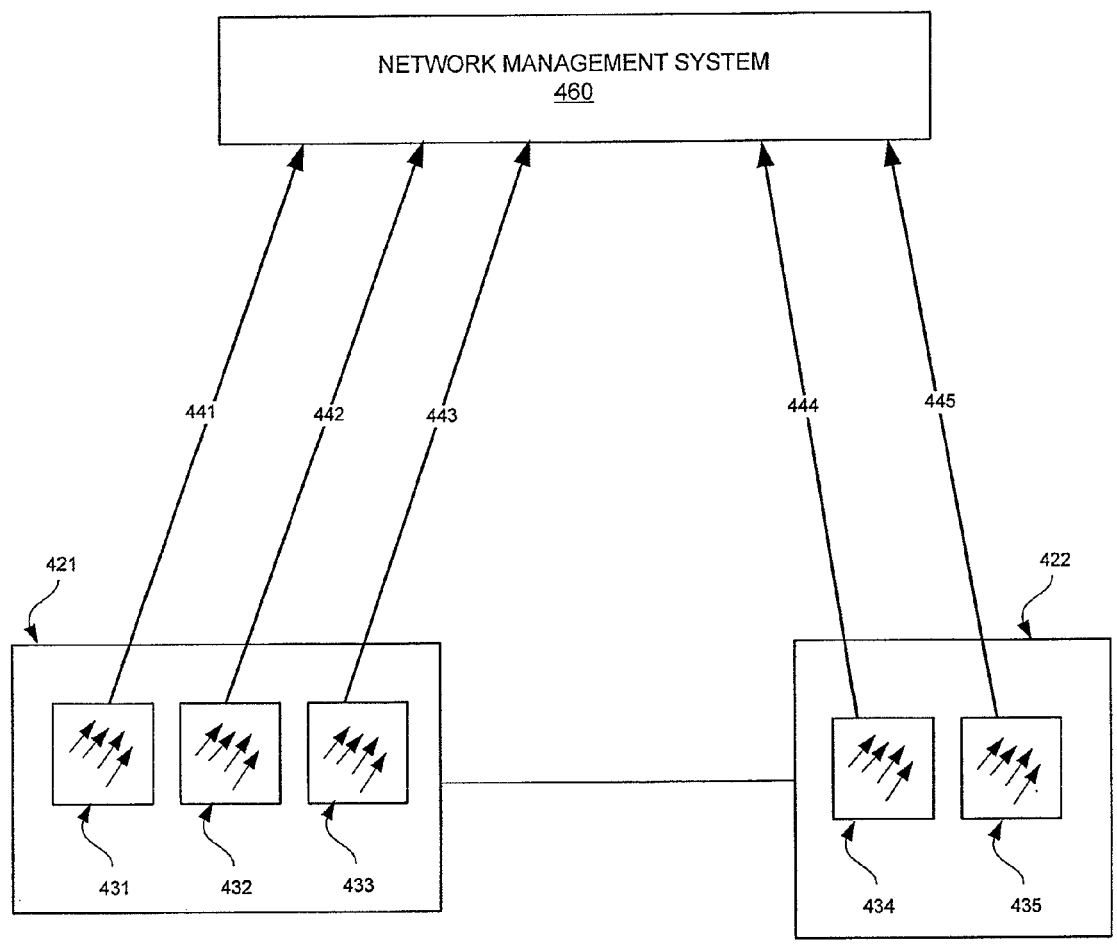
FIG. 4 is a diagram representing the sending of bulk trap messages, in accordance with an example embodiment of the present invention.

FIG. 4 illustrates trap messages being sent from network elements to a network management system, in accordance with an example embodiment of the invention. Network elements 421 and 422 are communicatively coupled to each other via a network, such as the network illustrated in FIG. 3. Network elements 421 and 422 communicate with network management system 460 through communication links, such as links 861 to 864 of FIG. 3. Network elements 421 and 422 are similar to network elements 811, 812, and 821 to 824 of FIG. 3, and network management system 460 is similar to network management system 860 of FIG. 3. Network element 421 and 422 can be routers, switches, hubs, network edge equipment, and premises equipment, or the like.

As illustrated, network element 421 has three buffers, 431, 432, and 433, each for a different type of manageable object. Network element 422 has two buffers, 434 and 435, each for a different type of manageable object. Manageable object types can include circuits, circuit bundles, virtual circuits, interfaces, and Multiprotocol Label Switching (MPLS) Label Switched Paths (LSPs), or the like. Buffers 431 to 435 store information for detected events, which can include, e.g., enabling an object, disabling an object, adding an object, deleting an object, changing attributes of an object, adding members to a group object, removing members from a group object, an object failure, an object recovery, and a change in operational status. This process of storing event information in a buffer is described below in more detail for FIG. 12A.

After a predetermined time period, network element 421 packages the event information stored in buffers 431 to 433 into bulk trap messages 441 to 443, respectively, and sends trap messages 441 to 443 to network management system 460 through a communication link (e.g., 861 to 864 of FIG. 3). This process is periodically repeated at regular time intervals, in an example embodiment of the invention. After one of buffers 431 to 433 contains information for a predetermined number events, network element 421 generates and sends the trap message for that buffer to network management system 460 before the predetermined time period has elapsed.

Similarly, network element 422 packages the event information stored in buffers 434 and 435 into bulk trap messages 444 and 445, respectively, and sends trap messages 444 and 445 to network management system 460 through a communication link (e.g., 861 to 864 of FIG. 3). This process of sending a bulk trap message which includes information stored in a buffer is described below in more detail for FIG. 12B.

FIGS. 5 to 9 illustrate example circuit bundle trap messages generated within the same time period by a network element (e.g., 421 or 422) having four circuit bundles "bun1", "bun2", "bun3", and "bun4". FIGS. 5 to 8 show individual circuit bundle trap messages generated when configuration properties for circuit bundles "bun1", "bun2", "bun3", and "bun4" specify that event information for these circuit bundles be sent in individual trap messages. FIG. 5 shows a circuit bundle bulk trap message generated when configuration properties for circuit bundles "bun1", "bun2", "bun3", and "bun4" specify that event information for these circuit bundles be stored in a circuit bundle buffer (e.g., 431 to 435), and sent in a single bulk trap message at a predetermined time.

As illustrated in FIGS. 5 to 8, within the same time period, a virtual circuit is added to circuit bundle "bun1" (FIG. 5), a virtual circuit is removed from circuit bundle "bun2" (FIG. 6), circuit bundle "bun3" is disabled (FIG. 7), and circuit bundle "bun4" has become operationally up (i.e., capable of sending and receiving packets) (FIG. 8).

In the trap message "cktBndlAddMbrV1Trap" of FIG. 5, virtual circuit "a1" (ID=4259) is added to circuit bundle "bun1" (ID=33554433) thereby bringing the total count of members in this bundle to 2. In the trap message "cktBndlDelMbrV1Trap" of FIG. 6, virtual circuit "a2" (ID=4258) is removed from circuit bundle "bun2" (ID=33555134) thereby bringing the total count of members in this bundle to 1. In the trap message "cktBndlOffLineV1Trap" of FIG. 7, circuit bundle "bun3" (ID=33555135) is offline, after being administratively disabled. In the trap message "cktBndlOnLineV1Trap" of FIG. 8, circuit bundle "bun4" (ID=33555136) is online, and virtual circuit "a4" (ID=4256) is the active bundle member.

FIG. 9. shows the same event information contained in FIGS. 5 to 8 packaged in a single bulk trap message ("CktBndlBulkChangeV1Trap"). In this example, the event information is packaged as a numerical value of a single SNMP trap variable binding ("circuitBundleBulkTrapEventBitMaskList.0"). In the illustrated embodiment, this numerical value is a hexadecimal value, but in other embodiments this value can be another type of numerical value. The description included in the bulk trap ("eventHistoryDescription.28467") summarizes the contents of the packaged event information. As shown in FIG. 9, this description indicates that one circuit bundle has become operationally up ("Up:1"), one circuit bundle has been administratively enabled ("en:1), one circuit bundle has been administratively disabled ("dis:1"), virtual circuits have been added to one circuit bundle ("mAdd:1"), and virtual circuits have been removed from one circuit bundle ("mDel:1"). Detailed information for each packaged event is determined by decoding the packaged information specified by "circuitBundleBulkTrapEventBitMaskList.0".

The value specified by "circuitBundleBulkTrapEventBitMaskList.0" is decoded as illustrated in FIG. 10, according to the following encoding/decoding convention:

Byte 1=version of the format of "circuitBundleBulkTrapEventBitMaskList.0" (1110 of FIG. 10)

Byte 2=the number of circuit bundle events that are in the trap (up to 90) (1120 of FIG. 10)

Bytes (n*12)+3, (n*12)+4, (n*12)+5, (n*12)+6=the circuit bundle id (1130 of FIG. 10) corresponding to the n-th circuit bundle event in the list, where the octet (n*12)+3 is the most significant byte of a 4-octet circuit bundle id and the octet (n*12)+6 is the least significant octet.

Bytes (n*12)+7, (n*12)+8=the 16-bit bitmask (1140 of FIG. 10) used to decode the information for the n-th circuit bundle event in the list, where the octet (n*12)+7 is the most significant byte of a 2-octet bitmask and the octet (n*12)+8 is the least significant octet. The format of this bitmask is shown in FIG. 11, wherein bits 0 and 1 indicate whether a circuit bundle has been enabled or disabled, bit 2 indicates whether the circuit bundle has become online, bit 3 indicates whether the circuit bundle has become offline, bit 4 indicates whether the circuit bundle has been deleted, bit 5 indicates whether the circuit bundle has been added, bit 6 indicates whether a circuit bundle attribute has changed, bit 7 indicates whether at least one virtual circuit has been added to the circuit bundle, and bit 8 indicates whether at least one virtual circuit has been removed from the circuit bundle. Bits are referenced from least significant bit to most significant bit, with 0 being the first least significant bit.

Bytes (n*12)+9=failure reason (1150 of FIG. 10) of the circuit bundle in the case of a circuit bundle going offline.

Bytes (n*12)+10, (n*12)+11, (n*12)+12, (n*12)+13=the id of the virtual circuit (1160 of FIG. 10) corresponding to the n-th circuit bundle event in the list, for an event wherein a virtual circuit is added or removed from a circuit bundle. The octet (n*12)+10 is the most significant byte of a 4-octet virtual circuit id and the octet (n*12)+13 is the least significant octet.

Bytes (n*12)+14=circuit bundle member (i.e., virtual circuit) priority and circuit bundle total member count (1170 of FIG. 10) corresponding to the n-th event in the list. The most 4 significant bits are member priority and the least 4 significant bits are circuit bundle total member count.

Figure 12A:
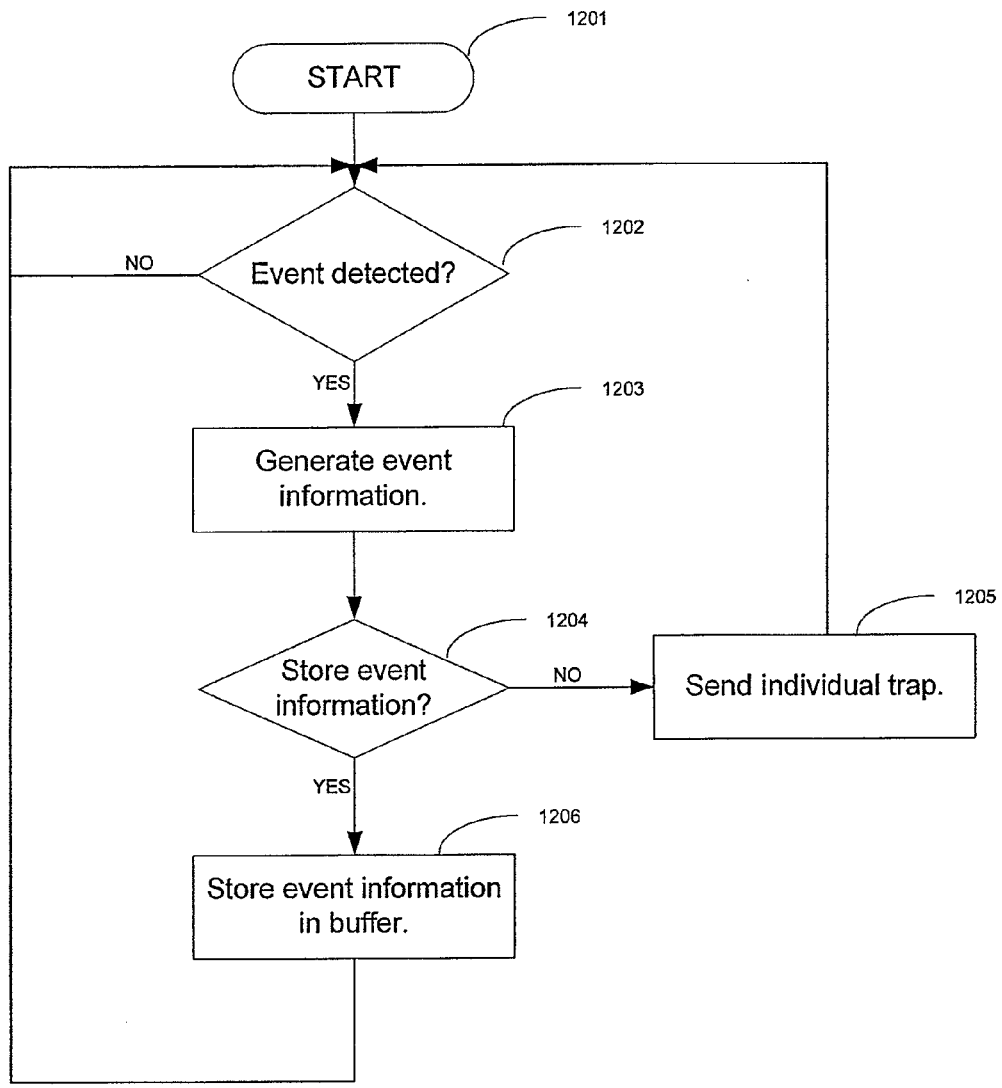
FIGS. 12A, 12B, and 13 are flow diagrams that illustrate a method for reporting events in a bulk trap message, in accordance with an example embodiment of this invention.
Figure 12B:
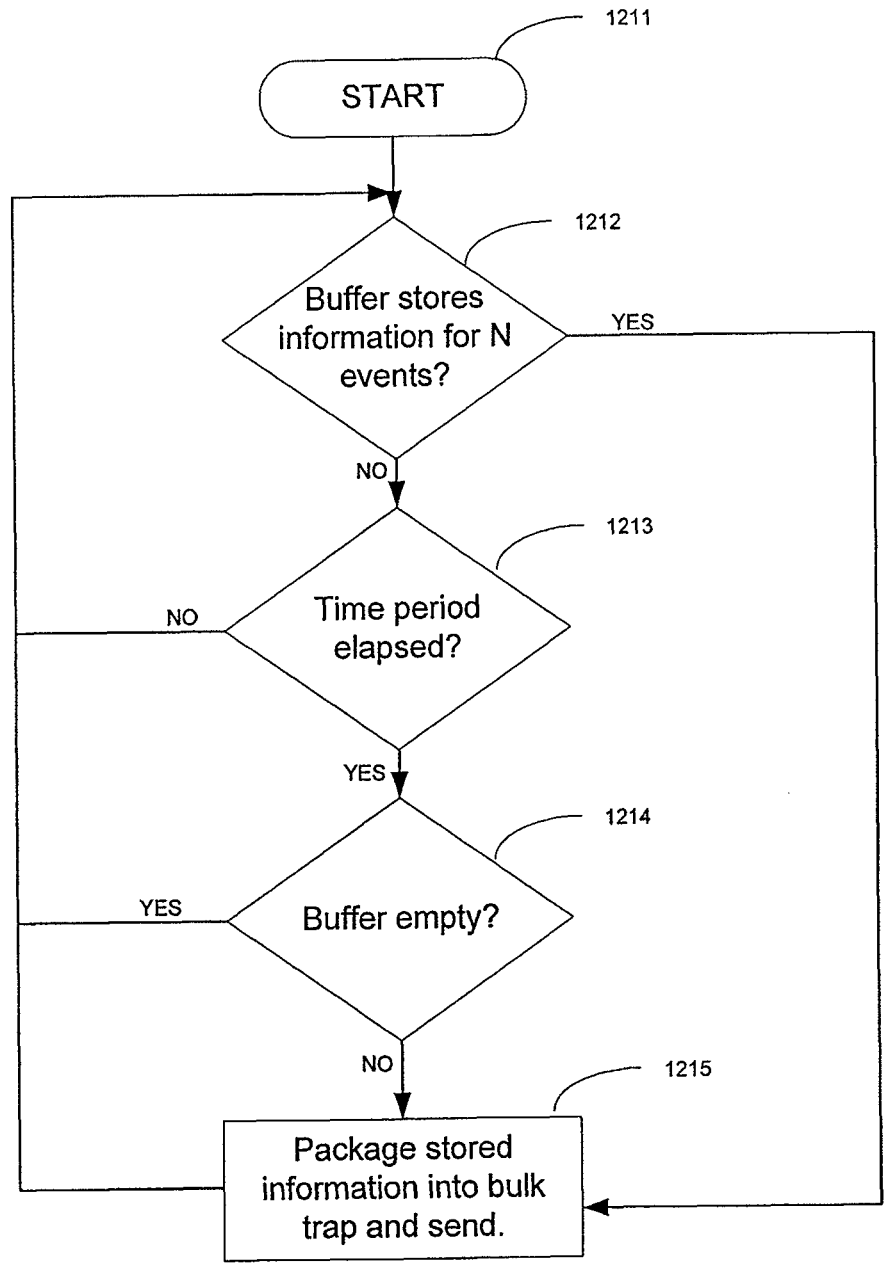
Figure 13:
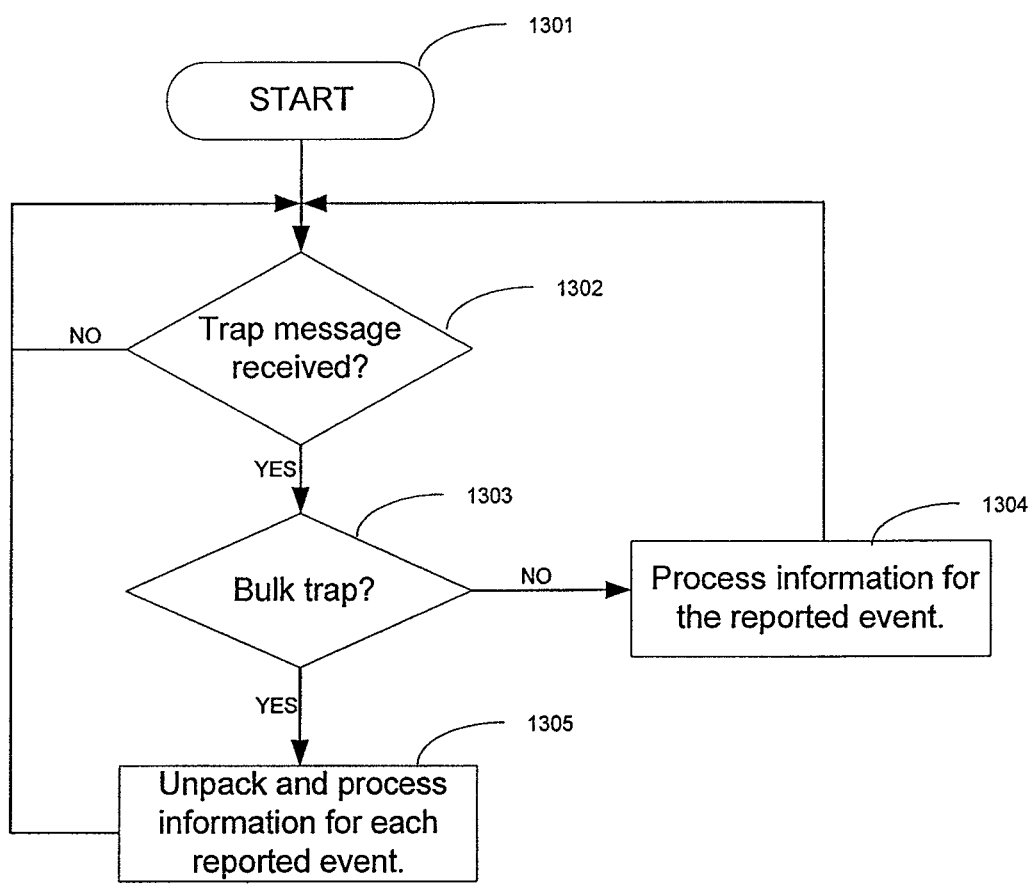

FIGS. 12A, 12B, and 13 are flow diagrams that illustrate a method for reporting events in a bulk trap message, in accordance with an example embodiment of this invention. FIG. 12A illustrates a process performed by a network element (e.g., 421 and 422) for storing event information in a buffer (e.g., 431 to 435), and FIG. 12B illustrates a process performed by a network element (e.g., 421 and 422) for sending a bulk trap message (e.g., 441 to 445). FIG. 13 illustrates a process performed by a network management system (e.g., 460) receiving a bulk trap message (e.g., 441 to 445).

At block 1201 of FIG. 12A, processing begins and proceeds to block 1202 where the network element (e.g., 421 and 422) monitors for predetermined events for each manageable object. The network element detects events by, e.g., monitoring for at least one of changes of configuration properties (e.g., included in 310a of FIG. 2) for each object, and by receiving alarm signals, notification messages, and/or instructions via its communication device (e.g., 314 of FIG. 2) and user interface (e.g., 318 of FIG. 2). If no events are detected ("NO" at block 1202), the network element continues monitoring for the events.

If an event is detected ("YES" at block 1202), processing proceeds to block 1203 where the network element generates event information for the event. The network element generates event information from, e.g., the monitored configuration property changes, received alarm signals, received notification messages, and/or received instructions, or the like. Event information can specify the nature of the event, the time when the event occurred, an object identifier identifying the object associated with the event, and any other suitable event information. Example event information is shown in FIGS. 5 to 9. For example, if the network element is monitoring for configuration changes for circuit bundles and detects that configuration for circuit bundle "bun1" has changed, the network element can generate event information that includes the circuit bundle identifier of "bun1", a description of the configuration change, and a time indicating when the configuration changes occurred.

After event information is generated, processing proceeds to block 1204 where the network element determines whether to store the event information or send the event information in an individual trap. The network element makes this determination based on a configuration property (e.g., included in 310a of FIG. 2) for the object associated with the event. If this configuration property specifies that event information for this object should not be stored ("NO" at block 1204), processing proceeds to block 1205 where the network element sends an individual trap (such as one of the traps illustrated in FIGS. 5 to 8) for this event through its communication device. Thereafter, processing proceeds to block 1202 where this process is repeated.

If this configuration property specifies that event information for this object should be stored ("YES" at block 1204), processing proceeds to block 1206 where the network element stores the event information in a buffer (e.g., 431 to 435) for the object associated with the event. After storing the event information, network element increments a counter for this buffer (stored as data 310a), which specifies the number of events having information stored in the buffer. The value of this counter is used to determine when to send a bulk trap message, as described below for FIG. 12B. Thereafter, processing proceeds to block 1202 where this process is repeated. Stored event information remains in the buffer until the network element determines that all the event information stored in the buffer should be sent in a bulk trap message, as illustrated in FIG. 12B.

FIG. 12B illustrates a process performed by the network element for each buffer (e.g., 431 to 435). At block 1211 of FIG. 12B, the network element activates a timer for the buffer. This timer is, e.g., a software timer included as program instructions 310b (FIG. 2), but in other embodiments, the timer can be a hardware timer. The timer keeps track of the expiration of at least one predetermined time period. At block 1212 the network element determines whether the buffer currently stores information for a predetermined number (N) of events. The network element makes this determination based on the value of the counter that is incremented when event information is stored in the buffer (at block 1206 of FIG. 12A). If information for N events are currently stored in the buffer ("YES" at block 1212), processing proceeds to block 1215 where the network element packages the stored event information for that buffer into a bulk trap, and sends the bulk trap via its communication device. The network element resets the counter after sending the bulk trap, and processing returns to block 1212.

The event information is packaged, e.g., by encoding the information as a numerical value that is decoded by the network management system receiving the bulk trap message. In the present example embodiment (which uses the SNMP protocol), the encoded numerical value is specified by a SNMP variable binding, but in embodiments using other network management protocols, the numerical value can be included in the trap message in any suitable manner. For circuit bundle objects, the event information is encoded according to the encoding/decoding convention described above for FIGS. 10 and 11.

If information for N events are not currently stored in the buffer ("NO" at block 1212), processing proceeds to block 1213 where the network element determines whether the timer indicates that a predetermined time period (starting at block 1211) has elapsed. If the predetermined time period has not elapsed ("NO" at block 1213), processing returns to block 1212 where this process is repeated.

If the predetermined time period has elapsed ("YES" at block 1213), the timer is reactivated, and processing proceeds to block 1214 where the network element determines whether the buffer is empty. If the buffer is empty ("YES" at block 1214), processing returns to block 1212 where this process is repeated. If the buffer is not empty ("NO" at block 1214), processing proceeds to block 1215 where the network element packages the stored event information into a bulk trap and sends the bulk trap via its communication device. Thereafter, processing returns to block 1212.

Bulk trap messages sent by the network element are received by a network management system (e.g., 460) and processed as illustrated in FIG. 13.

At block 1301 of FIG. 13, a network management system (e.g., 460) begins a process for receiving trap messages. At block 1302, the network management system monitors for whether a trap message has been received. If a trap message has not been received ("NO" at block 1302), processing returns to block 1302 and the network management system continues checking for received trap messages.

If a trap message has been received ("YES" at block 1302), processing proceeds to block 1303 where the network management system determines whether the received trap is a bulk trap. The network management system can determine whether the received trap is a bulk trap based on, for example, the event identifier (eventHistoryEventId.28467=1254) as shown in FIG. 9. If the received trap is not a bulk trap ("NO" at block 1303), processing proceeds to block 1304 where the network management system processes the received trap as an individual trap. Thereafter processing returns to block 1302.

If the received trap is a bulk trap ("YES" at block 1303), processing proceeds to block 1305 where the network management system unpacks the event information and processes the information for each reported event. The network management system unpacks the event information by, e.g., extracting the value of the bulk trap variable binding ("circuitBundleBulkTrapEventBitMaskList.0"), and decoding this numerical value to generate the event information. For circuit bundle objects, the event information is decoded according to, e.g., the encoding/decoding convention described above for FIGS. 10 and 11. Thereafter processing returns to block 1302.

Figure 14:
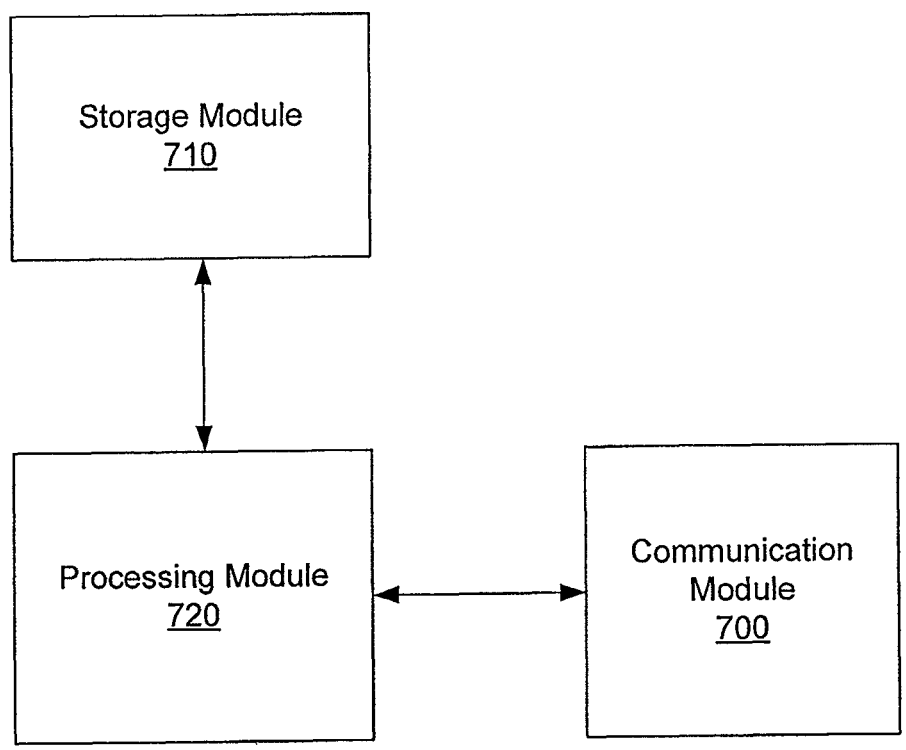
FIG. 14 is a logical diagram of functional modules in accordance with an example embodiment of the invention.

FIG. 14 is a logical diagram of modules in accordance with an example embodiment of the present invention. The modules may be of a data processing system or device 300, which, according to an example embodiment, can form individual ones of network elements (e.g., 811, 812, and 821 to 824 of FIG. 3, and 421 and 422 of FIG. 4), network management systems (e.g., 860 of FIGS. 3 and 460 of FIG. 4), and/or any other type of a network device supporting a network management protocol (e.g., SNMP). The modules may be implemented using hardcoded computational modules or other types of circuitry, or a combination of software and circuitry modules.

Communication interface module 700 controls communication device 314 by processing interface commands. Interface commands may be, for example, commands to send data, commands to communicatively couple with another device, or any other suitable type of interface command.

Storage device module 710 stores and retrieves data (e.g., event information, configuration properties, timer values, and counter values) in response to requests from processing module 720.

In the case of at least the network elements (e.g., 811, 812, and 821 to 824 of FIG. 3, and 421 and 422 of FIG. 4), processing module 720 performs the procedures as described above in connection with FIGS. 12A, and 12B for the network element. Processing module 720 detects events for each manageable object. Processor module 720 detects events by receiving configuration change notifications from storage module 710, and/or by receiving alarm signals, notification messages, and/or instructions from communication module 700. In response to detecting an event, processing module 720 generates event information as described above for FIG. 12A. After generating event information, processing module 720 retrieves the configuration property (for the object associated with the event) that specifies whether event information generated for this object should be stored or sent in an individual trap message. Based on this configuration property, processing module 720 either stores the event information in storage module 710, or sends the event information to communication module 700 which sends the information in an individual trap, as described above for FIG. 12A.

Processing module 720 continuously queries storage module 710 to determine whether any buffers store event information for a predetermined number of events. If a buffer has a predetermined number events, processor 720 retrieves the event information stored in the buffer from storage module 710, packages the information into a bulk trap, and sends the packaged information to communication module 700, which sends the bulk trap to a network management system, as described above for FIG. 12B.

Processor 720 repeatedly retrieves and packages event information stored in each buffer included in storage module 710 at regular time periods. For each buffer, processor 720 packages the information retrieved from storage module 710 into a bulk trap, and sends the packaged information to communication module 700, which sends the bulk trap to a network management system, as described above for FIG. 12B.

In the case of at least the network management system (e.g., 860 of FIG. 3, and 460 of FIG. 4), processing module 720 performs the procedures as described above in connection with FIG. 13 for the network management system. Communication module 700 retrieves trap messages, and sends retrieved trap messages to processing module 720, which determines whether the trap message is a bulk trap, as described above for FIG. 13. If the message is a bulk trap message, processing module 720 unpacks the event information and processes the information for each reported event.

By virtue of the example methods, system, devices, and control logic of the invention described herein, a network element can send fewer trap messages to report events relating to objects of the network element (e.g., circuits, circuit bundles, virtual circuits, interfaces, and MPLS LSPs), relative to conventional trap message processing systems. Because fewer trap messages may be sent in response to catastrophic failures or significant configuration changes, network congestion and processor overload at the network management system can be reduced or substantially minimized.

In the foregoing description, the invention is described with reference to specific example embodiments thereof. The specification and drawings are accordingly to be regarded in an illustrative rather than in a restrictive sense. It will, however, be evident that various modifications and changes may be made thereto, in a computer program product or software, hardware, or any combination thereof, without departing from the broader spirit and scope of the present invention.

Software embodiments of the present invention may be provided as a computer program product, or software, that may include an article of manufacture on a machine accessible or machine readable medium (memory) having instructions. The instructions on the machine accessible or machine readable medium may be used to program a computer system or other electronic device. The machine-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result. In other embodiments, functions performed by software can instead be performed by hardcoded modules, and thus the invention is not limited only for use with stored software programs.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive.

What is claimed is:

1. A network element comprising:
    at least one communications device coupled to a network management device; and
    a processor operable to
    (i) for each virtual object type of events detected by the network element, after a respective predetermined time period for the virtual object type has elapsed, encode event information generated by the network element for at least two events for the virtual object type occurring at different times before elapse of the predetermined time period, the event information being encoded into a numerical value of a single trap variable binding in a trap message, the numerical value comprising a series of sections each of which corresponds to an event, and
    (ii) send each trap message to the network management device.

2. The network element of claim 1, further comprising a memory, wherein the processor stores the event information for a same virtual object type in a same region in the memory, and wherein the processor periodically encodes the stored event information for each virtual object type into a trap message at predetermined time periods.

3. The network element of claim 2, wherein if a region of the memory contains information for a predetermined number of events, the processor encodes the event information into a trap message, and sends the trap message to the network management device.

4. The network element of claim 1, wherein each trap message is an SNMP trap message, for each trap message, the processor encodes the event information as an SNMP variable binding in the SNMP trap message, and the network management device includes a network management system (NMS) that processes each SNMP trap messages.

5. The network element of claim 1, wherein the network management device unpacks the event information by decoding the numerical value.

6. The network element of claim 1, wherein the network element includes at least one of a router, switch, hub, network edge equipment, and premises equipment.

7. The network element of claim 1, wherein each virtual object type includes at least one of circuits, circuit bundles, virtual circuits, interfaces, and Multiprotocol Label Switching (MPLS) Label Switched Paths (LSPs).

8. The network element of claim 1, wherein events include at least one of enabling an object, disabling an object, adding an object, deleting an object, changing attributes of an object, adding members to a group object, removing members from a group object, an object failure, an object recovery, and a change in operational status.

9. The network element of claim 1, further comprising a memory storing at least one configuration property for each virtual object, wherein the processor determines whether to store event information for a virtual object or send the event information to the network management device in an individual trap message, based on the at least one configuration property for the virtual object.

10. The network element of claim 1, wherein each virtual object type includes at least one of circuit bundles, virtual circuits, and Multiprotocol Label Switching (MPLS) Label Switched Paths (LSPs).

11. The network element of claim 1,
    wherein a timer is activated for each virtual object type, expiration of the timer indicating the elapse of the respective predetermined time period for the virtual object type,
    wherein after the predetermined time period has elapsed for a respective virtual object type, the timer is reactivated, and the event information for the respective virtual object type is encoded into the trap message and sent to the network management device,
    wherein the event information for a same virtual object type is stored in a same region in a memory, and
    wherein after the predetermined time period has elapsed for a respective virtual object type, the timer is reactivated, a determination is made as to whether a respective region in the memory stores any event information, and in a case where it is determined that the respective region in the memory does not store any event information, a respective trap message is not sent.

12. A network management device comprising:
    at least one communication device coupled to the at least one network element; and
    a processor operable to
    (i) receive encoded event information for at least two events detected by the at least one network element for a same virtual object type, the at least two events occurring at different times before elapse of a respective predetermined time period for the virtual object type, the encoded event information being a numerical value of a single trap variable binding in a trap message received from the network element, the numerical value comprising a series of sections each of which corresponds to an event, and
    (ii) unpack the encoded event information by decoding the numerical value into reportable event information.

13. The network management device of claim 12, wherein the trap message includes SNMP trap messages, the event information is encoded as an SNMP variable binding in the SNMP trap messages, and the network management device includes a network management system (NMS) that processes SNMP trap messages.

14. The network management device of claim 12, wherein the network management device unpacks the event information by decoding the numerical value.

15. The network management device of claim 12, wherein the network element includes at least one of a router, switch, hub, network edge equipment, and premises equipment.

16. The network management device of claim 12, wherein the virtual object type includes at least one of circuits, circuit bundles, virtual circuits, interfaces, and Multiprotocol Label Switching (MPLS) Label Switched Paths (LSPs).

17. The network management device of claim 12, wherein the events include at least one of enabling an object, disabling an object, adding an object, deleting an object, changing attributes of an object, adding members to a group object, removing members from a group object, an object failure, an object recovery, and a change in operational status.

18. The network management device of claim 12, wherein each virtual object type includes at least one of circuit bundles, virtual circuits, and Multiprotocol Label Switching (MPLS) Label Switched Paths (LSPs).

19. The network management device of claim 12,
wherein a timer is activated for each virtual object type, expiration of the timer indicating the elapse of the respective predetermined time period for the virtual object type, and
wherein after the predetermined time period has elapsed for a respective virtual object type, the timer is reactivated, and the event information for the respective virtual object type is encoded into the trap message and sent to the network management device,
wherein the event information for a same virtual object type is stored in a same region in a memory, and
wherein after the predetermined time period has elapsed for a respective virtual object type, the timer is reactivated, a determination is made as to whether a respective region in the memory stores any event information, and in a case where it is determined that the respective region in the memory does not store any event information, a respective trap message is not sent.

20. A system for managing network elements, the system comprising:
at least one network element, the network element including:
at least one communications device, and
a processor operable to
(i) for each virtual object type of events detected by the network element, after a respective predetermined time period for the virtual object type has elapsed, encode event information generated by the network element for at least two events for the virtual object type occurring at different times before elapse of the predetermined time period, the event information being encoded into a numerical value of a single trap variable binding in a trap message, the numerical value comprising a series of sections each of which corresponds to an event, and
(ii) send each trap message; and
a network management device, including:
at least one communication device coupled to the at least one communication device of the at least one network element, and
a processor operable to (i) receive each trap message from the at least one network element, each trap message including the encoded event information, and (ii) unpack the encoded event information by decoding the numerical value into reportable event information.

21. A method controlling a network element, the method comprising:
for each virtual object type of events detected by the network element, after a respective predetermined time period for the virtual object type has elapsed, encoding event information generated by the network element for at least two events for the virtual object type occurring at different times before elapse of the predetermined time period, the event information being encoded into a numerical value of a single trap variable binding in a trap message, the numerical value comprising a series of sections each of which corresponds to an event; and
sending each trap message to a network management device.

22. The method of claim 21, further comprising storing the event information for a same virtual object type in a same region in a memory, and periodically encoding the stored event information for each virtual object type into a trap message at predetermined time periods.

23. The method of claim 22, wherein if a region of the memory contains information for a predetermined number of events, the processor encodes the event information into a trap message, and sends the trap message to the network management device.

24. The method of claim 21, wherein the network management device unpacks the event information from each trap message.

25. The method of claim 21, wherein each trap message is an SNMP trap message, for each trap message, the event information is encoded as an SNMP variable binding in the SNMP trap message, and the network management device includes a network management system (NMS) that processes each SNMP trap message.

26. The method of claim 21, wherein the event information is unpacked by decoding the numerical value.

27. The method of claim 21, wherein the network element includes at least one of a router, switch, hub, network edge equipment, and premises equipment.

28. The method of claim 21, wherein each virtual object type includes at least one of circuits, circuit bundles, virtual circuits, interfaces, and Multiprotocol Label Switching (MPLS) Label Switched Paths (LSPs).

29. The method of claim 21, wherein the events include at least one of enabling an object, disabling an object, adding an object, deleting an object, changing attributes of an object, adding members to a group object, removing members from a group object, an object failure, an object recovery, and a change in operational status.

30. The method of claim 21, further comprising determining whether to store event information for a virtual object or send the event information to the network management device in an individual trap message, based on a configuration property for the virtual object.

31. The method of claim 21, wherein each virtual object type includes at least one of circuit bundles, virtual circuits, and Multiprotocol Label Switching (MPLS) Label Switched Paths (LSPs).

32. A non-transitory computer-readable storage medium storing control logic for causing a network element to report events relating to virtual objects, the control logic comprising:
computer-readable program code to encode, for each virtual object type of events detected by the network element, and after a respective predetermined time period for the virtual object type has elapsed, event information generated by the network element for at least two events for the virtual object type occurring at different times before elapse of the predetermined time period, the event information being encoded into a numerical value of a single trap variable binding in a trap message, the numerical value comprising a series of sections each of which corresponds to an event; and computer-readable program code to send each trap message to a network management device.

33. The computer-readable storage medium of claim 32, further comprising computer-readable program code to store the event information for a same virtual object type in a same region in a memory, and computer-readable program code to periodically encode the stored event information for each virtual object type into a trap message at predetermined time periods.

34. A non-transitory computer-readable storage medium storing control logic for causing a network management device to receive messages from at least one network element, the control logic comprising:

computer-readable program code to receive encoded event information for at least two events detected by the at least one network element for a same virtual object type, the at least two events occurring at different times before elapse of a respective predetermined time period for the virtual object type, the encoded event information being a numerical value of a single trap variable binding in a trap message received from the network element, the numerical value comprising a series of sections each of which corresponds to an event; and computer-readable program code to unpack the encoded event information by decoding the numerical value into reportable event information.

* * * * *